United States Patent [19]

Fulton

[11] 3,725,819

[45] Apr. 3, 1973

[54] SUPERCURRENT DEVICES WITH ENHANCED SELF-FIELD EFFECTS

[75] Inventor: Theodore Alan Fulton, Berkeley Heights, N.J.

[73] Assignee: Bell Telephone Laboratories Incorporated, Murray Hill, Berkely Heights, N.J.

[22] Filed: July 26, 1971

[21] Appl. No.: 166,129

[52] U.S. Cl. ................331/107 S, 307/306, 307/309, 317/234 C, 317/235 H, 324/43 R, 331/132, 340/173.1

[51] Int. Cl. ........G01r 33/02, H03b 7/02, H03k 3/38

[58] Field of Search ...331/107 S, 132; 307/212, 245, 307/277, 306, 309; 324/43 R; 340/173.1; 317/234 C, 235 H

[56] References Cited

UNITED STATES PATENTS

| | | | |
|---|---|---|---|
| 3,363,200 | 1/1968 | Jakleric et al. | 332/51 R |
| 3,445,760 | 5/1969 | Zimmerman | 324/43 |
| 3,533,018 | 10/1970 | Jaklevic et al. | 307/306 X |
| 3,549,991 | 12/1970 | Silver et al. | 307/306 X |

*Primary Examiner*—John Kominski
*Assistant Examiner*—Siegfried H. Grimm
*Attorney*—R. J. Guenther et al.

[57] ABSTRACT

A supercurrent device comprising a pair of weak-link regions connected in a superconducting loop is driven by a current source. In series with the loop is an inductor for generating a magnetic field (i) proportional to the current flowing through the loop and (ii) the flux of which extends through the loop. The device, which exhibits both negative resistance and discrete supercurrent states at zero voltage, functions in several ways including: as a negative resistance oscillator, as a memory device, or as a highly sensitive linear magnetometer.

9 Claims, 5 Drawing Figures

SUPERCURRENT DEVICES WITH ENHANCED SELF-FIELD EFFECTS

BACKGROUND OF THE INVENTION

This invention relates to cryogenic devices and more particularly to weak-link supercurrent devices.

In a paper entitled "Possible New Effects in Superconductive Tunneling," published in the July 1, 1962 issue of *Physics Letters*, pages 251 to 252, B. D. Josephson predicted theoretically that a supercurrent would flow between two superconductors separated by a thin insulating barrier (i.e., an SIS supercurrent tunnel junction) by a mechanism known as two-particle superconducting tunneling. This effect has been observed and reported by P. W. Anderson and J. M. Rowell in a paper entitled "Probable Observation of the Josephson Superconducting Tunneling Effect" and published in the Mar. 15, 1963 issue of *Physical Review Letters*, pages 230 to 232.

Other geometries exhibit the supercurrent phenomenon but are not limited to two-particle tunneling. P. W. Anderson and A. H. Dayem describe in *Physical Review Letters*, 13, 195 (1964) a superconducting bridge which has effects nearly identical to those observed in the planar SIS Josephson structure. In U.S. Pat. No. 3,423,607 issued Jan. 21, 1969 and assigned to applicant's assignee, J. E. Kunzler et al. teach the existence of supercurrents in point contact structures. More recently, D. E. McCumber discovered the existence of supercurrent Josephson-like phenomena in SNS structures, i.e., superconductor-normal metal-superconductor structures, as disclosed in U.S. Pat. No. 3,573,661 issued Apr. 6, 1971, also assigned to applicant's assignee.

In general, supercurrent device comprises an interfacial region between a pair of superconductive regions. As pointed out in the previous examples, the interfacial region may be formed in a variety of geometries including SIS, SNS, point contact, and bridge-type structures. The interfacial region in each of the above cases is a weak-link region interconnecting the superconductive regions, the weak-link breaking down when a critical current is exceeded. The weak-link is the thin insulator in the SIS structure, the normal metal in the SNS structure, the region of contact in the point contact structure and the region of minimum cross-sectional area in the bridge structure.

Each of these structures exhibits effects analogous to, but not limited to, the Josephson two-particle tunneling effect. When the current through the structure is increased from zero, the voltage across the interface remains zero over a range of current below a first critical supercurrent designated $I_c$. When the current flow through the interface exceeds the first critical supercurrent, the voltage across the interface abruptly increases to some finite value. Furthermore, when the current is reduced from above to below that critical supercurrent, the voltage across the interface may remain finite until a second critical supercurrent, termed the switchback current, is reached whereupon the interface voltage again drops to zero.

Numerous applications have been proposed for weak-link supercurrent devices including logic elements, current amplifiers, oscillators and magnetometers. In the latter category a common structure comprises a pair of weak-link regions, usually Josephson junctions (U.S. Pat. No. 3,363,200 of R. C. Jaklevic et al.) or point contacts (U.S. Pat. No. 3,445,760 of J. E. Zimmerman), electrically connected in parallel by means of a superconducting loop or ring that encloses a space capable of supporting a magnetic field. Due to interferometric effects described below, the supercurrent flow in this type of magnetometer, also termed an interferometer, is highly sensitive to magnetic flux in the area enclosed by the loop or ring. In particular, all such magnetometers exhibit an oscillatory dependence of some of their properties (e.g., the value of $I_c$ and the shape of the I-V curve) upon magnetic flux. The period of these oscillations corresponds to the flux quantum equal approximately to $2.07 \times 10^{-15}$ webers. For example, with an area enclosed in the loop of a few hundredths of a square millimeter this period will be a few milligauss. Such a magnetometer is capable of detecting minute traces of magnetic field typically as small as $10^{-10}$ gauss.

The operation of the magnetometer is based upon the principle that the zero-voltage supercurrent flowing through a weak-link region (e.g., Josephson junction) is a periodic function of the superconductor phase difference $\Delta\phi$ across the junction, e.g., sin $\Delta\phi$ for Josephson junctions. The phase $\phi$ herein referred to is one of the parameters of the mathematical wave function which defines the superconducting state in one side of the junction. The phase on either side need not be equal and so a phase difference $\Delta\phi$ may be defined. For a pair of such junctions in a superconductor loop, the difference $(\Delta\phi_1 - \Delta\phi_2)$ between the phase differences in each junction is a linear function of the total magnetic flux $\Phi$ linking the loop; that is, $$\Delta\phi_1 - \Delta\phi_2 = 2\pi\Phi/\Phi_o, \qquad (1)$$

where $\Phi_o$ is the previously mentioned flux quantum.

If current from an external source is made to flow through the superconductor loop, the maximum current which the loop can carry at zero voltage is finite and is a function of the difference $(\Delta\phi_1 - \Delta\phi_2)$. The current carried is maximum when the difference, equation (1), is equal to zero, modulo $2\pi$, in which case the currents in the two weak-link junctions add constructively. On the other hand, it is minimum when the difference is equal to $\pi$, modulo $2\pi$, in which case the currents in the two weak-link junctions interfere destructively. Consequently, the maximum zero-voltage current is a periodic function of the flux linking the loop and that period is the flux quantum $\Phi_o$.

SUMMARY OF THE INVENTION

In accordance with an illustrative embodiment of my invention a pair of weak-link regions are electrically connected in parallel by a closed superconducting path forming a loop which is connected to a current source. In series with the loop is an inductor for generating a magnetic field (i) proportional to the current flowing through the loop and (ii) the flux lines of which extend through the loop. The I-V curve of the supercurrent device of my invention is characterized by a function which oscillates between converging limits and exhibits (i) negative resistance and (ii) discrete supercurrent states at zero voltage. By adjusting the mutual inductance between the inductor and the loop, as well as by controlling the magnitude of an external magnetic field applied normal to the plane of the loop, it is possible to operate my invention as a negative resistance oscillator, a memory element or a highly sensitive linear magnetometer.

BRIEF DESCRIPTION OF THE DRAWING

My invention, together with its various features and advantages, can be more easily understood from the following more detailed description taken in conjunction with the accompanying drawing, in which.

DETAILED DESCRIPTION

Figure 1:
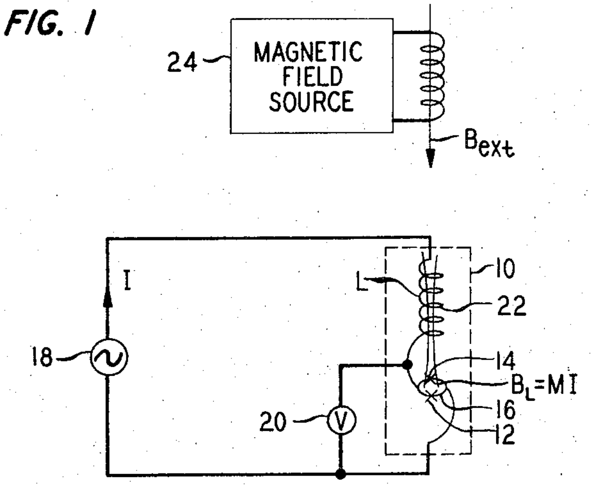
FIG. 1 is a schematic of an illustrative embodiment of my invention.

Turning now to FIG. 1, there is shown a schematic of an illustrative embodiment of my invention, a supercurrent device 10 comprising a pair of weak-link regions 12 and 14 (e.g., Josephson SIS junctions) electrically connected in parallel by a closed superconducting path which forms a ring or loop 16 capable of sustaining a magnetic field in the area enclosed by the loop. The superconducting loop 16, including the regions 12 and 14, is driven by a current source 18 and the resulting voltage drop across the loop is measured by a voltmeter 20.

In accordance with my invention, there is electrically connected in series with the loop 16 self-field means 22 responsive to the current flow through the loop for generating a magnetic field $B_L$ whose flux $\Phi_L$ penetrates the area enclosed by the loop. Means 22 illustratively comprises a coil or inductor disposed so that its longitudinal axis is preferably normal to the plane defined by loop 16. Additionally, the flux $\Phi_{ext}$ of an external magnetic field $B_{ext}$ also penetrates the loop 16, where $\Phi_{ext} = A \cdot B_{ext}$, $A$ being a constant equal to the effective loop area. This field may be generated intentionally as by magnetic field source 24 in order to control the characteristics of device 10 or may, for example, be a stray field to be measured when device 10 is used as a magnetometer.

Before, however, discussing in detail the several device applications resulting from the aforementioned structure, it will be helpful to consider first the characteristics of the device of FIG. 1 in the absence of self-field means 22, i.e., with the latter replaced by a short circuit. More specifically, curves I*a*–I*c* of FIG. 3 depict the typical dependence of the critical supercurrent $I_c$ on the total magnetic flux $\Phi_{TOT}$ penetrating the loop. In the absence of self-field means 22, however, $\Phi_{TOT}$ reduces simply to $\Phi_{ext}$. Thus, the three curves I*a*, I*b*, and I*c* represent three successive shapes of the I-V curve as $\Phi_{ext}$ is increased. (There are of course, an infinite number of such curves). The curves transform smoothly from one curve to the next as $\Phi_{ext}$ increases, with curves I*a* and I*c* being the extremes and all other curves lying therebetween. As $\Phi_{ext}$ is increased steadily with time, the I-V curve goes through the sequence of shapes *a*, *b*, *c*, *b*, *a*, *b*, *c*, *b*, . . . . The corresponding values of critical supercurrent $I_c$ (point 30 of line II, FIG. 3) oscillate with the same period as shown by curve IV of FIG. 2.

In contrast, in my invention the dependence of the critical supercurrent $I_c$, as well as the shape of the I-V curve, are modified by the addition to the external flux $\Phi_{ext}$ of a magnetic flux $\Phi_L$ proportional to the current I flowing in loop 16. That is, the total magnetic flux $\Phi_{TOT}$ linking loop 16 is given by $$\Phi_{TOT} = \Phi_{ext} - MI = \Phi_{ext} + \Phi_L \quad (2)$$

where $M$, a constant, is the mutual inductance defining the coupling strength between coil 22 and loop 16. Although equation (2) omits magnetic flux contributions from ring currents in the loop 16, it can be shown that such contributions make no important difference to the self-field effects being analyzed.

Figure 2:
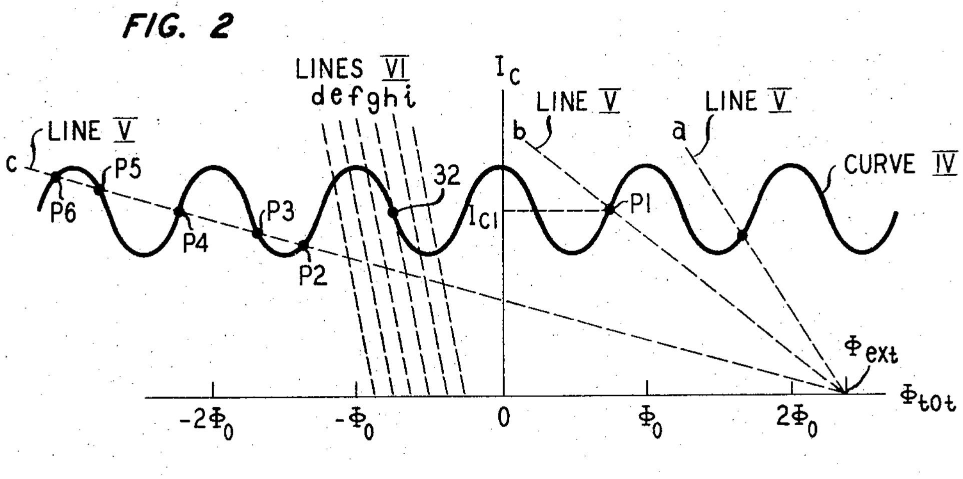
FIG. 2 is a graph showing the approximate relationship between the critical supercurrent $I_c$ and the total magnetic flux $\Phi_{TOT}$ in the loop of FIG. 1.
Figure 3:
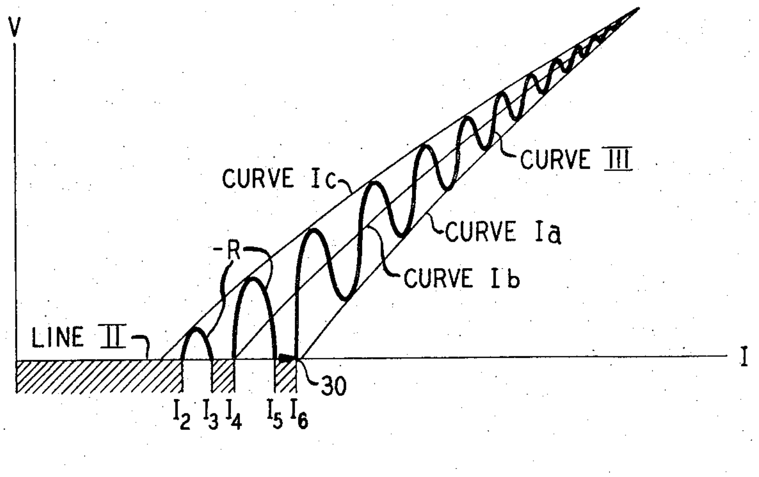
FIG. 3 is an approximate I-V curve for the embodiment of FIG. 1.

The operation of my invention is best understood with reference to FIG. 2, a plot of critical supercurrent versus magnetic field. Curve IV represents the variation of $I_c$ ($\Phi_{TOT}$) in the absence of coil 22 (or in the absence of coupling between coil 22 and loop 16, more generally). On the other hand, lines V*a*–V*c* and lines VI*d* – VI*i* represent the paths in the $I$–$\Phi_{TOT}$ plane which the device of FIG. 1 follows under the constraint of equation (2); that is, these lines are a plot of $$I = 1/M\,(\Phi_{ext} - \Phi_{TOT}).$$

The intercept of these lines for $I = 0$ is $\Phi_{ext}$ and the slope is $1/M$. Thus, lines V*a* to V*c*, in that order, represent increasing $M$ and constant $\Phi_{ext}$ whereas parallel lines VI*d*–VI*i* represent constant $M$ and decreasing $\Phi_{ext}$. Moreover, the intersection of these lines with curve IV for $I_c(\Phi_{TOT})$ defines the points at which the device passes from a supercurrent state into a finite voltage state. For example, at currents above $I_{c1}$ and on line V*b*, the critical supercurrent corresponding to point P1 at the intersection of line V*b* and curve IV, the device is in a finite voltage state, whereas at currents below $I_{c1}$, the device is in a zero-voltage supercurrent state.

From a memory device standpoint lines such as line V*c* of FIG. 2 are of particular interest. That is, for large values of $M$ the small slope of line V*c* leads to multiple intersections (P2–P6) with curve IV for $I_c(\Phi_{TOT})$. Consequently, as current is increased from zero, the device will alternate several times between a finite voltage state and a zero voltage supercurrent state. More specifically, for currents between P2 and P3, between P4 and P5, and for currents above P6, the device is in a finite voltage state. Similarly, for currents between P5 and P6, between P3 and P4, and for currents below P2, the device is in a zero voltage supercurrent state. The number of such discrete supercurrent regimes, and the spacing therebetween, can be controlled by varying the value of $M$. The greater $M$, the more regimes and the narrower the spacing therebetween, and conversely.

In FIG. 3, curve III represents a typical I-V characteristic of a device having a mutual inductance $M$ adjusted to produce three discrete supercurrent states, i.e., a device corresponding to line Vc of FIG. 2. Points I2–I6 of FIG. 3 correspond to the currents associated with points P2–P6 of FIG. 2 and so define three supercurrent states: below I2, I3 to I4 and I5 to I6. The shape of the I-V curve can be understood as follows: As current is increased, so is the total magnetic flux (equation (2)) so that the I-V curve constantly changes from curve I*a* to I*b* to Ic and back again. The result is oscillations in the I-V curve as shown by curve III, FIG. 3. The larger the value of *M* the more closely spaced are the ripples. This effect is consistent with the larger number of discrete supercurrent states predicted for larger values of *M* as mentioned previously.

Since three discrete states are available in the device corresponding to line V*c*, it can be utilized in a ternary information system. In a binary system two of the three states may be used or *M* may be decreased so that only two discrete supercurrent states exist. Similarly, *M* may be increased to produce four or more such states for use in a quaternary or high order system, respectively. In any event, information may be read into such a memory device by an information source which may be either a current source or magnetic field source. Since each supercurrent state supports a different amount of flux, the memory device can be nondestructively read out by means of a magnetometer positioned to sense the field in the loop. Destructive readout, on the other hand, can be accomplished by applying a control current to the device to cause it to switch out of its supercurrent state, the magnitude of the resulting voltage pulse being related to the particular memory state.

Figure 5:
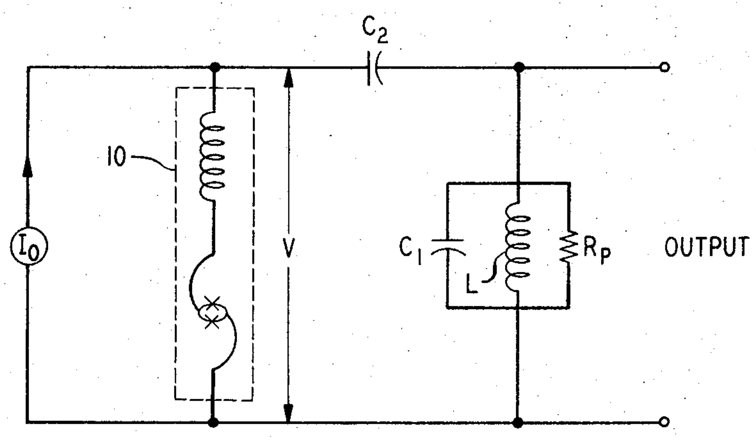
FIG. 5 is a schematic of another embodiment of my invention for use as a negative resistance oscillator.

It can also be seen that many portions of the I-V curve of FIG. 3 exhibit negative differential resistance, particularly those portions, designated −R, lying between the discrete supercurrent regimes. Consequently, when current is biased in one of these regions, the device of my invention can be operated as a negative resistance oscillator. Consider, for example, the circuit schematic of FIG. 5 which shows a tank circuit, consisting of capacitor $C_1$ in parallel with inductor L, connected in parallel with a self-fielded supercurrent device as previously described with reference to FIG. 1. The resistance $R_p$ is the equivalent parallel resistance of the tank circuit whereas the capacitor $C_2$ serves to block DC voltages but transmits AC at the resonant frequency of the tank.

To produce oscillations, the device 10 is biased to a current $I_o$ which corresponds to a negative resistance portion of curve III, FIG. 3 such that $$|dV/dI|_{I=I} > R_p; \quad (3)$$

that is, the negative resistance provides more gain than the dissipative losses of the tank circuit resulting in oscillations in the output at an angular frequency given by $$\omega \approx (1/LC_1)^{1/2} \quad (4)$$

which is typically in the megacycle range.

Figure 4:
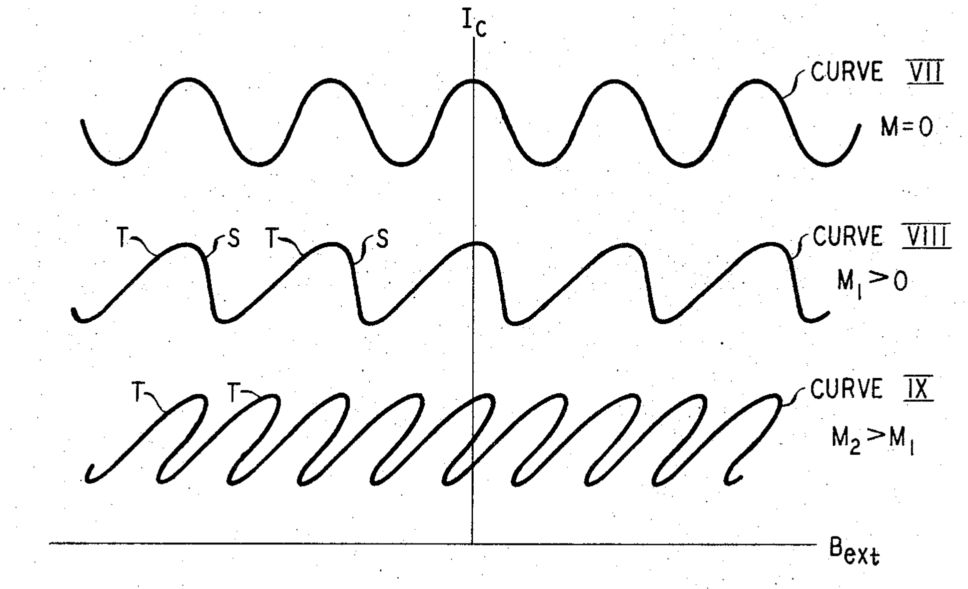
FIG. 4 is an approximate graph of $I_c$ versus the flux $\Phi_{ext}$ due to an externally applied magnetic field $B_{ext}$ for different values of mutual inductance M.

In contrast, from an instrumentation standpoint lines VI*d* – VI*i*, which show a family of solutions to equation (2) for fixed *M* and increasing $\Phi_{ext}$, are of particular interest. When the ordinate of the intersection of these lines with curve IV is plotted against $\Phi_{ext}$, the result is a skewed version of $I_c(\Phi_{TOT})$ as shown in FIG. 4, curve VIII. This curve exhibits a very steep slope in the regions S, FIG. 4 which correspond to the intersection of curve IV with line VI*g*, FIG. 2. The steep slope results because the slopes of curve Iv and line VI*g* are nearly the same at their point of intersection 32. The slope in the regions S, FIG. 4 can in fact be made arbitrarily steep by choosing the values of *M* and $B_{ext}$ so that a line, such as line VI*g*, is tangent to curve IV at a point of maximum slope of the latter. Biasing the device at such a point leads to enhanced magnetometer sensitivity for small changes in $B_{ext}$. It is furthermore important to note that in the regions T, FIG. 4, the relationship between $I_c$ and $B_{ext}$ is highly linear over a substantial range of $B_{ext}$, a highly desirable feature in the detection of fields often as small as $10^{-11}$ gauss. That is, by increasing the value of *M*, the relationship between $I_c$ and $B_{ext}$ can be made re-entrant as shown in FIG. 4, curve IX. In this case, the extent in $B_{ext}$ of the linear region T can be increased greatly by increasing *M*.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, it is well within the skill of the art to make the aforementioned changes in mutual inductance including appropriate designs to produce negative *M* where necessary.

What is claimed is:

1. A supercurrent device comprising
   a supercurrent interferometer to which a current source is connectable and which includes
   a pair of weak-link regions, and
   a closed superconducting path electrically connecting said regions in parallel with respect to the flow of current from said source, said path forming a ring-like structure enclosing an area capable of being penetrated by a magnetic field, and characterized by
   means adapted to be responsive to the flow of current from said source and through said interferometer for generating in said area a magnetic field proportional both to said current and to the magnetic coupling strength between said generating means and said structure.

2. The device of claim 1 wherein said responsive means comprises at least one inductance coil electrically connected in series with said interferometer.

3. The device of claim 1 wherein:
   in the absence of said responsive means the relationship between the critical supercurrent of said device and the magnitude of a magnetic field penetrating said area is a function which oscillates periodically with changing field;
   the total magnetic flux $\Phi_{TOT}$ penetrating said area is given approximately by the equation $$\Phi_{TOT} = \Phi_{ext} - MI$$

where *M* is said coupling strength, *I* is the current flowing in said path and $\Phi_{ext}$ is the magnitude of flux contributions of all other magnetic fields penetrating said area; and for a particular $\Phi_{ext}$ the value of *M* is adjusted so that the line defined by said equation is approximately tangent to said function at a point of maximum slope thereof.

4. The device of claim 1 wherein the current-voltage characteristic of said device has at least one region of negative differential resistance, and including a resonant circuit electrically coupled to said device and having an equivalent resistance representing dissipative losses therein, and means for biasing said device in one of said regions so that said negative resistance exceeds said equivalent resistance.

5. The device of claim 4 wherein:

said resonant circuit comprises at least one capacitor connected in parallel with at least one inductor; and the output taken across said circuit oscillates at an angular frequency of approximately (*LC*)thus ⁻1/2, *L* and *C* being, respectively, the total parallel inductance and capacitance of said circuit.

6. The device of claim 5 including at least one blocking capacitor connected in series between said device and said circuit.

7. The device of claim 1 wherein the current-voltage characteristic of said device has a plurality of discrete supercurrent regimes at zero voltage separated by finite-voltage, nonsupercurrent regimes and including means for causing said device to operate in a selected one of said supercurrent regimes.

8. The device of claim 7 wherein operation in each of said discrete supercurrent regimes generates a different magnitude of magnetic field penetrating said area of said ring-like structure, and including means for detecting said field to determine in which one of said regimes said device is operating.

9. The device of claim 1 in combination with a current source connected to said interferometer.

* * * * *